United States Patent [19]

Yoshimi

[11] Patent Number: 4,942,416

[45] Date of Patent: Jul. 17, 1990

[54] PROCESSING SOLUTION FILTERING DEVICE HAVING A FILTER IN A PROCESSING SOLUTION CONTAINER

[75] Inventor: Yasuhito Yoshimi, Kyoto, Japan

[73] Assignee: Dainippon Screen Mfg. Co., Ltd., Japan

[21] Appl. No.: 286,518

[22] Filed: Dec. 19, 1988

[30] Foreign Application Priority Data

Dec. 19, 1987 [JP] Japan ................................ 62-193275

[51] Int. Cl.$^{5}$ ................................................ G03B 3/06

[52] U.S. Cl. .................................... 354/299; 354/322; 354/324; 210/167; 210/172; 210/310

[58] Field of Search ............... 354/320, 321, 322, 324, 354/325, 299; 210/167, 172, 416.1, 238, 304, 310

[56] References Cited

U.S. PATENT DOCUMENTS 4,182,567 1/1980 Laar et al. ........................... 354/324
4,780,737 10/1988 Kobayashi et al. ................. 354/299
4,806,962 2/1989 Uchida et al. ....................... 354/324

FOREIGN PATENT DOCUMENTS 208222 8/1959 Austria ................................ 354/324
1116842 6/1968 United Kingdom ................ 354/324

*Primary Examiner*—A. A. Mathews
*Attorney, Agent, or Firm*—Ostrolenk, Faber, Gerb & Soffen

[57] ABSTRACT

A system for filtering circulating photosensitive material processing solution. The system includes a container for containing the circulating photosensitive material processing solution. The container has an inlet for receiving the circulating solution and an outlet for discharging the circulating solution. The system further includes a filter detachably covering the inlet or the outlet. The filter has an upper portion which projects above the surface of the circulating solution when the container is filled with the circulating solution. Thus, the filter can be easily removed from and attached to the container.

15 Claims, 6 Drawing Sheets

PROCESSING SOLUTION FILTERING DEVICE HAVING A FILTER IN A PROCESSING SOLUTION CONTAINER

BACKGROUND OF THE INVENTION

1. Field of the Invention

The present invention relates to a filtering device for use in a system for processing photosensitive material 2. Description of the Background Art:

FIG. 1 illustrates a conventional system. The conventional system includes a processing solution container 2 having an outlet 8, an inlet 10, and a device 70 for circulating processing solution. The circulating device 70 is connected to the outlet 8 and the inlet 10. The container 2 may further include guide rollers (not shown) for holding and guiding a strip of film 7 through a transporting passage.

The circulating device 70 includes a pipe 72 connected between the outlet 8 and the inlet 10. Circulating processing solution passes through the pipe 72. A pump 4 is connected to the pipe 72 for applying pressure to the processing solution to circulate the same. A heating means 6 is connected to the pipe 72 for keeping the processing solution at a predetermined temperature. A filter 73 is connected to the pipe 72 for removing unnecessary materials such as sludge or dust caused by a chemical reaction, or the like, in the processing solution.

FIG. 2 illustrates a filter disclosed in Japanese Patent Laying-Open No. 75316/1985. The filter 73 of the prior art includes a filter case 74 connected to a pipe 72, and a filter 90 contained in the filter case 74. The filter case 74 is a cylinder having an opening at its upper end. The upper end is closed by a cover plate fixed by a bolt, a nut, or the like. A lower side of a hollow portion in the filter case 74 is provided with a partition plate 76 The inside of the filter case 74 is divided into a filtering chamber 78 and a collecting chamber 80 by the partition plate 76. Fixing cylinders 88 (having an equal diameter) are provided on the lower surface of the cover plate 82 and the upper surface of the partition plate 76. A cylindrical filter 90 is fixed in the cylinders 88. The filtering chamber 78 has an inlet 84 for the processing solution. The collecting chamber 80 has an outlet 86 for the processing solution. A central portion of the partition plate 76 has an opening by which the hollow portion inside the filter 90 communicates with the collecting chamber 80 when the filter 90 is fixed inside the case 74.

Referring to FIG. 1, the processing solution in the processing solution container 2 flows from the outlet 8 into the pipe 72. The pump 4 applies pressure to the processing solution to send it into the filter case 74. Unnecessary materials in the processing solution are removed by the filter case 74. The processing solution is heated in the heating means 6 to a predetermined desired temperature for processing photosensitive material and the heated solution is supplied through the inlet 10 into the container 2. The processing solution is agitated by circulation which results in high quality processing.

The processing solution flows into the filtering chamber 78 through the inlet 84. The processing solution passes through the filter 90. Then, the processing solution flows from the hollow portion of the filter 90 into the collecting chamber 80 through the opening at the center of the partition plate 76. Filtrate such as sludge or dust are removed while the processing solution passes through the filter 90. The filtered processing solution returns to the pipe 72 through the outlet 86.

When the filter should be replaced or cleaned, cover plate 82 is removed from the filter case 74. The filter 90 is taken out through the opening of the upper end of the filter case 74. A clean filter is fitted in the filter case 74. Then, the cover plate 82 is fixed to the filter case 74.

The conventional system has certain disadvantages. For example, since the filter case is connected to the circulating device, it is difficult to manufacture and maintain the system in good condition. In addition, in order to exchange filters, it is necessary to locate the filter case at a preferred upper, front or lateral position of the device by prolonging the pipe. Thus, the length of the pipe is increased and the arrangement becomes complicated. As a result, manufacturing and maintaining the device is difficult.

Another disadvantage is that since the filter case is connected to the pipe and since the filter case includes an opening for exchange of filters, leakage of the processing solution is liable to occur. Accordingly, leakage of processing solution may occur not only from a connection portion of the filter case and the pipe but also from the opening of the filter case when filters are exchanged. In addition, although the opening of the filter case is usually closed by the cover plate, solution may leak from this cover plate portion.

Still another disadvantage in the prior art is that filter exchange work is troublesome. At the time of exchanging filters, it is necessary to follow a sequence of complicated procedures such as securely closing the pipe connected at both ends of the filter, removal of the cover plate of the filter case with a tool, replacement of the filter with a new one, refixing the cover plate with a tool and reopening the pipe connected to both ends of the filter. These procedures take much time and must be performed without fail. For example, if one fails to reopen the pipe at either end of the filter after the exchange, the processing solution will not circulate and will not be filtered. Consequently, the quality of the processing solution will deteriorate and, since the processing solution is not stirred, processing of photosensitive material will be inferior. In addition, if the cover plate is not securely refixed, the processing solution might leak out from the filter case.

For these reasons, it is necessary to follow the proper sequence of procedures without fail at the time of exchange of filters. However, these procedures are troublesome.

SUMMARY OF THE INVENTION

The filter is set in the processing solution container. Consequently, connection of the filter to the circulating device is not required. In addition, in designing the circulating device, it is not necessary to provide for the exchange of filters. As a result, the processing solution circulating device has a simple structure. Therefore, the present invention makes it possible to provide a photosensitive material processing solution filtering device having a processing solution circulating device which is easily manufactured and maintained.

The invention is directed to a system for filtering circulating photosensitive material processing solution. The system includes a container for containing the circulating photosensitive material processing solution. The container has an inlet for receiving the circulating solution and an outlet for discharging the circulating solution. The system further includes a filter detachably covering the inlet or the outlet. The filter has an upper portion which projects above the surface of the circulating solution when the container is filled with the circulating solution. Thus, the filter can be easily removed from and attached to the container.

The present invention is also directed to a method of easily replacing a filter within a photosensitive material processing system without leakage. The method includes removing a filter from an outlet of a container which is full of the photosensitive material processing solution by gripping and manipulating an upper portion of the filter. The upper portion of the filter is located above the surface of the photosensitive material processing solution. The method further includes attaching a replacement filter to the outlet of the container by gripping and manipulating an upper portion of the replacement filter. The upper portion of the replacement filter is located above the surface of the photosensitive material processing solution.

In a preferred embodiment, the filter is fixed to the outlet of the processing solution container and can be replaced with a new one within the processing solution container. Therefore, it is not necessary to provide a particular opening for replacement of a filter in the processing solution circulating device. Furthermore, it is not necessary to provide for connection of the filter within the circulating device. Accordingly, there is little possibility of leakage of processing solution.

In a preferred embodiment, to remove the filter from the processing solution container, one only has to hold a grip member as an integral part thereof and remove the filter from the outlet. Similarly, to fix the filter to the outlet, only a reverse operation is required. Preparation or aftertreatment is not particularly required when exchanging filters. Further, there is no fear of leakage of the processing solution, which would be caused in the prior art by exchanging filters. Thus, the present invention provides a filter which can be easily exchanged.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
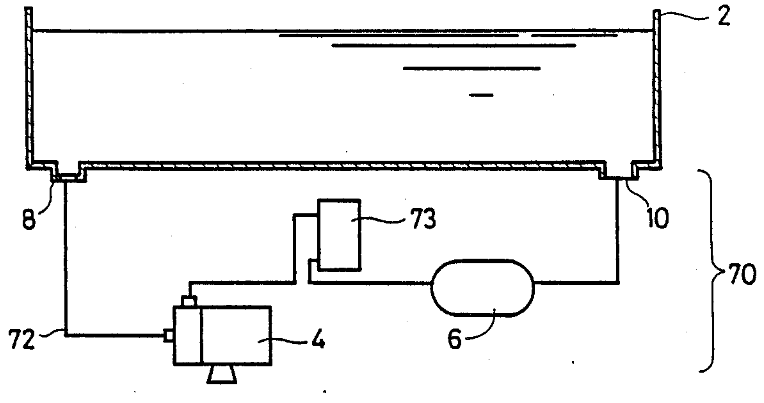
FIG.1 PRIOR ART
FIG. 1 is a side sectional view of a conventional system.
Figure 2:
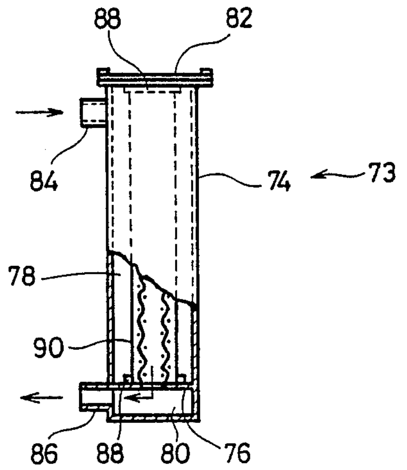
FIG.2 PRIOR ART
FIG. 2 is a partial side sectional view of a conventional filter.
Figure 3:
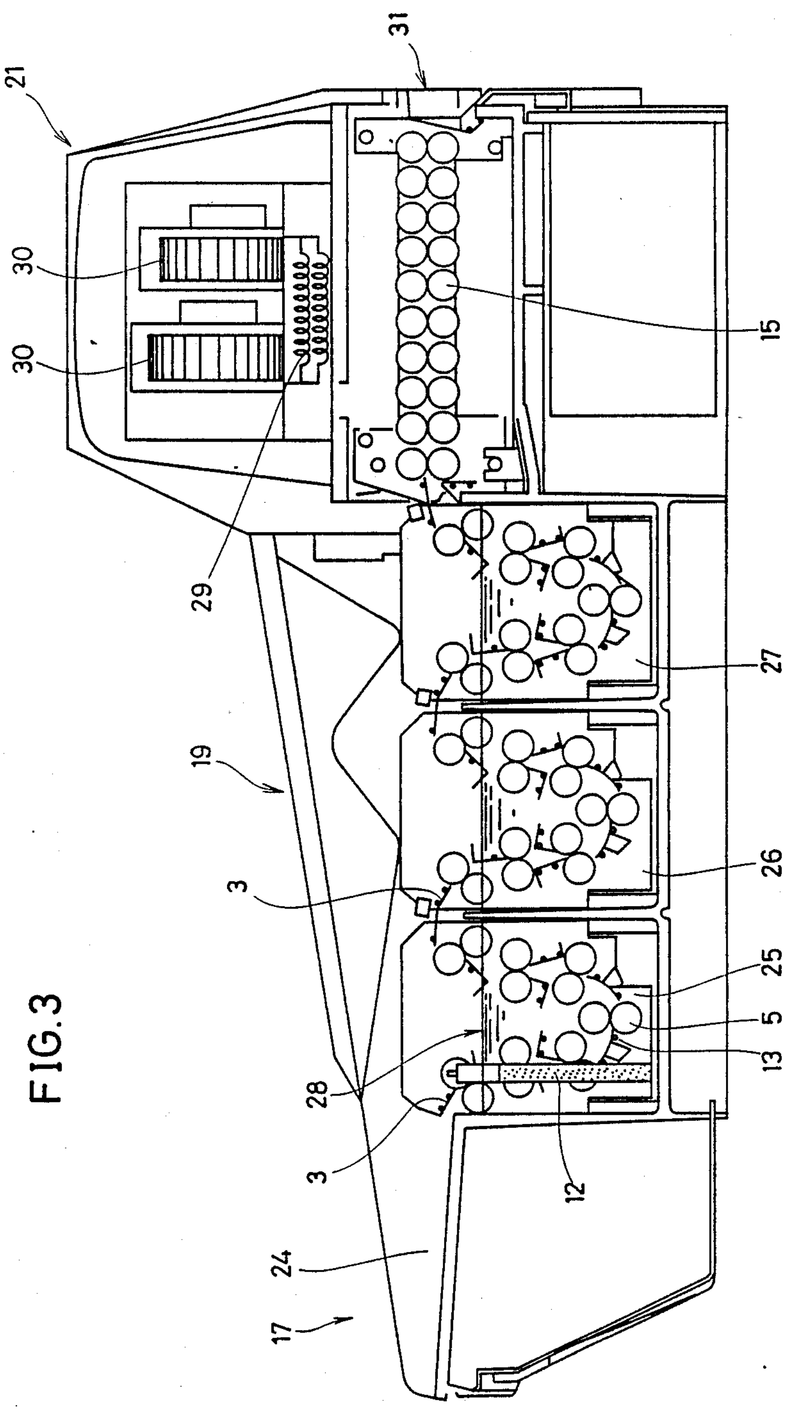
FIG. 3 is a schematic illustration of a processing apparatus with a filtering device in accordance with the invention.

FIG. 3 schematically illustrates a processing apparatus suited for processing a continuous strip of film, using a filtering device of a preferred embodiment of the invention. The processing apparatus includes a processing unit 19 for processing the strip of film, a feed-in unit 17 for feeding the processing unit 19 with the strip of film, and a drying unit 21 for drying the processed strip of film.

The processing unit 19 includes a developing bath 25, a fixing bath 26 and a rinsing bath 27 in series-connected fashion.

The feed-in unit 17 includes a feed-in tray 24 arranged on one side of the developing bath 25 remote from the fixing bath 25. The feed-in unit 17 provides an entrance to a transport passage that extends from one end to the other of the processing apparatus.

The drying unit 21 includes feed rolls 15 for transporting the processed strip of film, blowers 30 and energized heating elements 29 for producing a hot air flow.

The developing bath 25 includes guiding members 3, 13, sets of paired feed rolls 5, and a filter 12 fixed on the outlet of the developing bath 25. The upper end of the filter 12 protrudes from the surface of the developing solution 28.

Figure 4:
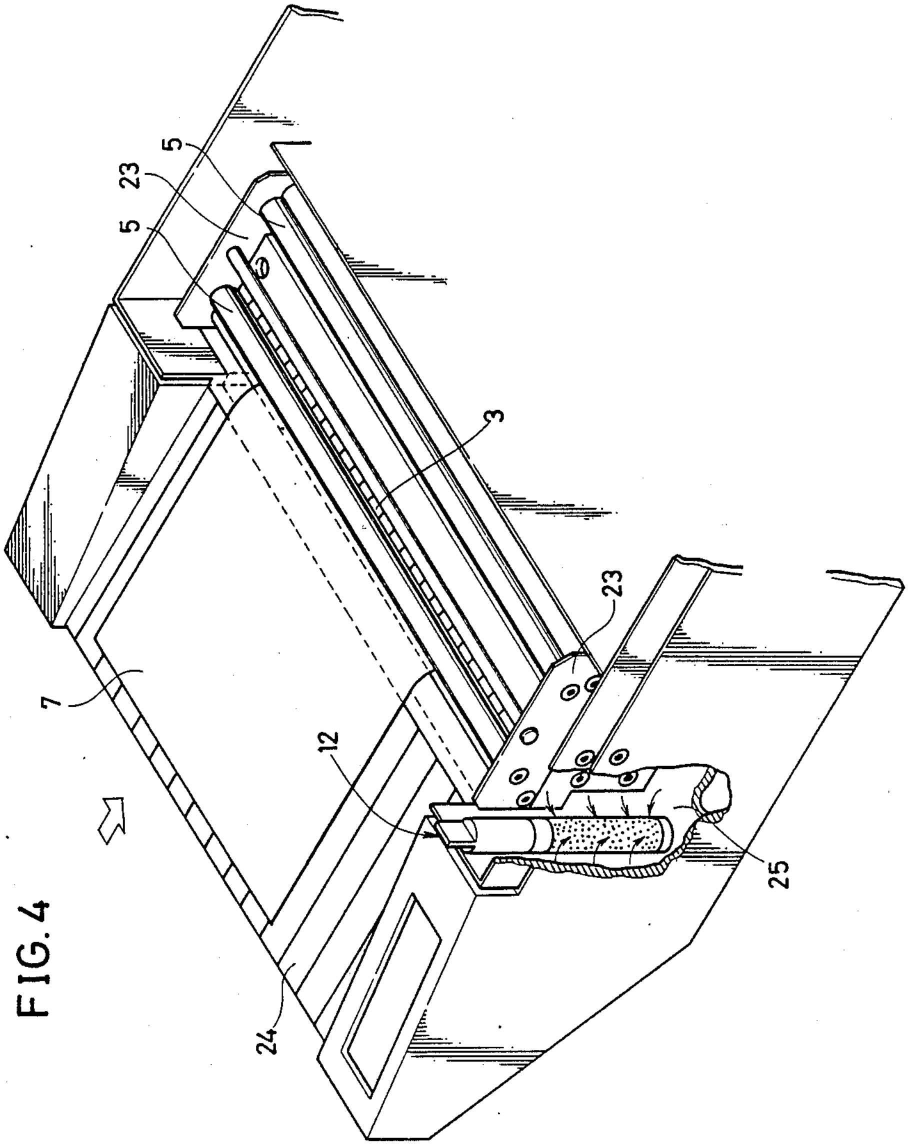
FIG. 4 is a partially cutaway perspective view of a portion of the apparatus of FIG. 3.

Referring to FIG. 4, the filter 12 is located on the bottom of the developing bath 25 so as not to cause any obstructions to movements of the guide members 3 and feed rolls 5.

Referring again to FIG. 3, the feed-in unit 17 provides the processing unit 19 with the strip of film. The strip of film is transported through the portion of the transport passage in the processing unit 19 which extends in a generally zigzag fashion defined by the guide members 3, 5, and sets of paired feed rolls 5, 15, driven by driving means (not shown). The strip of film can be successively immersed first into the developing bath 25, then into the fixing bath 26, and finally into the rinsing bath 27.

The strip of film, emerging from the processing unit 19, is continuously passed through the drying unit 21, in which the strip of film is dried by the hot air flow produced by the blowers 30 and the heating elements 29.

In the construction so far described, the strip of film, being photographically exposed, emerges outwardly from the processing apparatus through the outlet opening 31.

Figure 5:
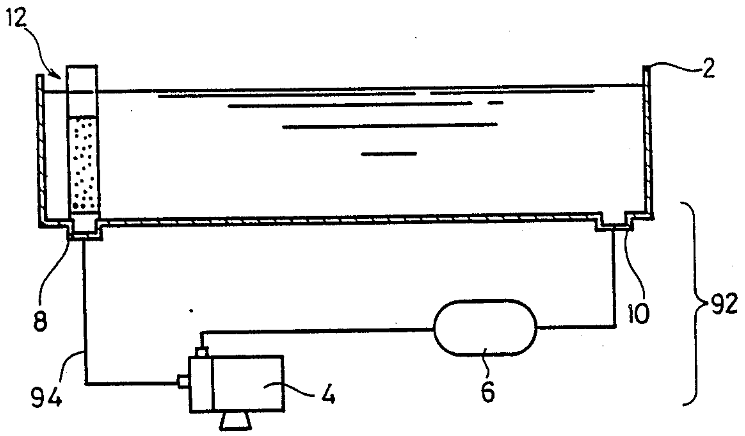
FIG. 5 is a side sectional view of a filter according to one embodiment of the invention.

The system illustrated in FIG. 5 includes: a processing solution container 2 for storing processing solution; an outlet 8; an inlet 10; filter 12 for removing unnecessary materials such as sludge or dust and circulating means 92 for circulating the processing solution. The circulating means 92 includes: a pipe 94 connected between the outlet 8 and the inlet 10 for guiding the circulating processing solution; a pump 4 connected to the pipe 94 for applying pressure to the processing solution to circulate the same; and a heating device 6 connected to the pipe 94 for maintaining the processing solution at a predetermined temperature.

The processing solution container 2 includes guide means (not shown) for guiding film 7 so that the film 7 may pass through a predetermined transport passage.

Figure 6:
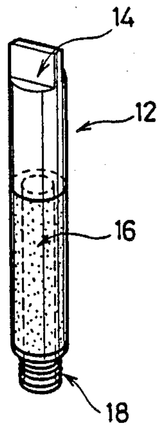
FIG. 6 is a perspective view of a filter according to a second embodiment of the invention.

The filter 12 illustrated in FIG. 6 includes: a cylindrical filter 16 for filtering the processing solution to remove sludge, dust or the like therefrom, a grip 14 fixed at the upper end of the filter 16, and a joint 18 detachably connectable to the outlet 8.

The grip 14 has a cylindrical portion with a diameter equal to that of the filter 16 and a flat plate on the cylindrical portion. The filter 16 is preferably formed by heating and integrally molding small spheres of acrylonitrile-butadienestyrene copolymer resin (ABS resin). The joint 18 is a cylinder of synthetic resin (such as ABS resin) and has a through-hole penetrating from its upper end to its lower end and a disc-shaped projected portion around a central portion of its outer side wall. A lower outer circumference of the joint 18 has a threaded portion for engaging a female threaded portion provided on the inner side wall of the outlet 8 to attach the joint 18 to the outlet 8. The upper portion of the joint 18 fits in a hollow portion of the lower end of the filter 16. The joint 18 and the filter 16 are bonded with adhesive to form a unitary body.

Figure 7:
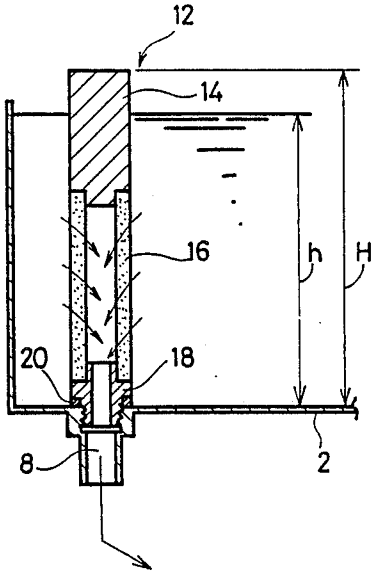
FIG. 7 is a partial sectional view of a processing solution container, with the filter of FIG. 6.

Referring to FIG. 7, the filter 12 is fixed in the processing solution container by means of the joint 18. In this case, assuming that the height from the bottom surface of the processing solution container 2 to the upper end of the filter 12 is H and that the height from the bottom surface of the container 2 to the surface of the processing solution is h, the structure satisfies the condition H is greater than h. A packing 20 is provided between the joint 18 and the container 2 to prevent leakage.

Referring to FIGS. 3 to 6, the pump 4 moves the processing solution in the pipe 94 from the outlet 8 to inlet 10. The processing solution passes through the filter 16 from the container 2 and flows into the pipe 94 through the outlet 8. The processing solution moves through the pipe 94, passes through the pump 4 and the heating device 6, and returns into the container 2 through the inlet 10.

Referring particularly to FIG. 7, the processing solution passes through the side wall of the filter 16 and enters the hollow portion of the filter 16. The processing solution entering the through-hole of the point 18 from the lower end of the filter 16 enters the outlet 8 through the joint 18. Since the joint 18 covers the outlet 8, the processing solution does not enter the outlet 8 without passing through filter 16.

As a result, filtrate in the processing solution, such as sludge or dust, caused by chemical reaction are filtered off by the filter 16 and only filtered processing solution circulates in the photosensitive material processing system. Further, the processing solution is stirred during the circulation, which is desirable for processing photosensitive material.

Referring to FIGS. 5 and 6, the upper end of the filter 12 projects above the surface of the processing solution. If the filter 12 is rotated to disengage the threads of the joint 18 and the outlet 8 while the upper end of the member 12 is held, the filter 12 can be removed from the container 2. To attach a new filter 12 to the container 2, it is enough only to follow a procedure which is opposite to that of the removing procedure. This exchange work does not require any special tool and is very easy to do. This work will be more easily carried out if the upper end of the grip 14 is a flat plate so as to be easily grasped. The filter 16 may be formed by cloth around a hollow core member, or it may be formed by porous ceramic. In the case of porous ceramic, the filter 16 does not need to be cylindrical.

Figure 8:
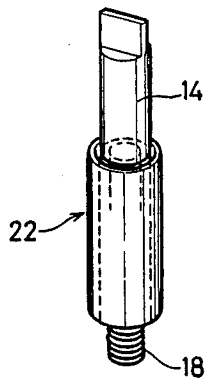
FIG. 8 is a perspective view of a filter according to a third embodiment of the invention.
Figure 9:
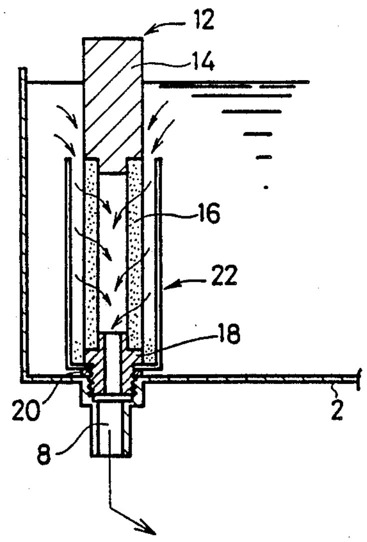
FIG. 9 is a partial sectional view of a processing solution container, with the filter of FIG. 8.

The filter illustrated in FIGS. 8 and 9 includes a filtrate collecting means, namely, a filter cover 22 for collecting filtrate removed by the filter 16.

Referring to FIG. 8, the filter cover 22 is cylindrical and is located around a lower part of the filter 12. Referring to FIG. 9, the filter cover 22 entirely covers the lower part of the filter 12 and is fixed to the filter 12. The upper end of the filter cover 22 opens in the processing solution.

In the system illustrated in FIG. 9, processing solution circulates as in the previously described embodiment. The processing solution flows into the filter cover 22 through the opening of the upper end thereof. The processing solution passes through the side wall of the filter 16 and enters the hollow portion of the filter 16. On this occasion, unnecessary materials such as sludge or dust in the processing solution are filtered off by the filter 16. The processing solution in the hollow portion of the filter 16 passes through the through-hole of the joint 18 and is introduced into the outlet 8.

Part of the sludge or other filtrate removed from the processing solution by the filter 16 might drop down from the filter 16 during replacement of the filter device 12 or by any other cause. However, such sludge or other filtrate is deposited in the bottom portion in the filter cover 22 and does not return into the processing solution.

Normally, a small amount of sludge or other unnecessary material drops down from the filter 16 without causing any problem. However, when using a photosensitive material which may be adversely affected (unevenly processed) by sludge or other unnecessary material, the filter cover 22 effectively protects the photosensitive material.

Figure 10:
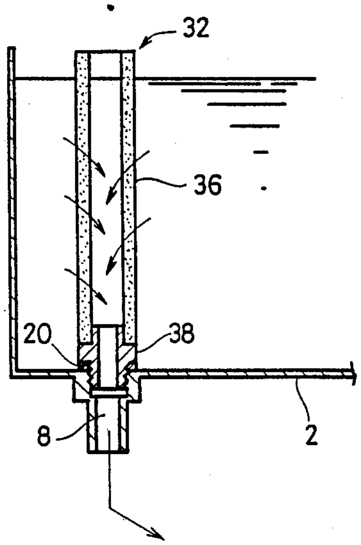
FIG. 10 is a partial sectional view of a processing solution container, with a filter according to a fourth embodiment of the invention.

Referring to FIG. 10, the filtering device includes a processing solution container 2 having an outlet 8, an inlet (not shown), and filter device 32 connected to the outlet 8 for removing sludge or other unnecessary material from the processing solution.

The filter device 32 includes a cylindrical filter 36 for filtering off sludge or other unnecessary material from the processing solution and a joint 38 provided at the lower end of the filter 36 for detachably connecting the filter 36 to the outlet 8. A packing 20 for preventing leakage of the processing solution is provided between the joint 38 and the container 2.

The filter 36 is a cylinder formed, for example, by heating and integrally molding small spheres of the ABS resin. The joint 38 is formed of synthetic resin such as ABS resin. The joint 38 is a cylinder having a through-hole penetrating from its upper end to its lower end and a disc-shaped projected portion around a central portion of the joint's side wall. Threads are provided around an outer circumference of a lower portion of the joint 38 for engaging female threads located on an inner side surface of the outlet 8. An upper portion of the joint 38 is fitted in the hollow portion of the lower end of the filter 36 and bonded thereto by adhesive.

The filter device 32 has a length such that the upper end of the filter 36 projects above the surface of the processing solution when the lower end of the filter device 32 is connected to the outlet 8 of the container 2.

In operation, the processing solution passes into the hollow portion through the side wall of the filter 36. Sludge or unnecessary material is removed by the filter 36. The processing solution further passes through the through-hole of the joint 38 and is discharged into the pipe 94 through the outlet 8. Since the upper end of the filter 36 projects above the surface of the processing solution, the processing solution containing the sludge or other unnecessary material does not flow into the hollow portion of the filter 36. Therefore, only filtered processing solution is circulated.

In addition, by holding and rotating the portion of the filter device 32 projecting from the liquid surface, the user can easily detach the filter device 32 from the container 2 and easily replace the filter device 32 with a new one.

Figure 11:
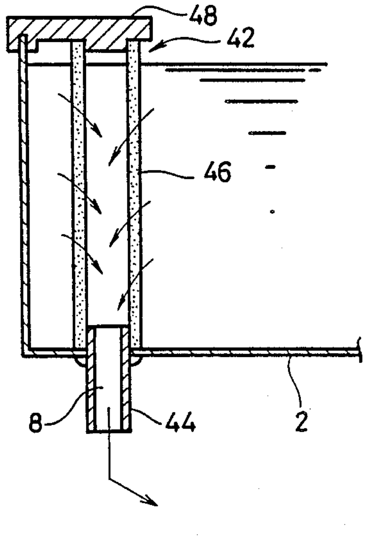
FIG. 11 is a partial sectional view of a processing solution container, with a filter according to a fifth embodiment of the invention.

Referring to FIG. 11, a container 2 has an outlet 8 and an inlet (not shown). A filter device 42 is connected to the outlet 8 for removing sludge or other unnecessary material from the processing solution. A support member 48 has one end detachably fixed to the upper end of the filter device 42 and the other end detachably fixed to the upper end of the side wall of the container 2 to stably support the filter device 42.

The filter device 42 includes a filter 46 for filtering the processing solution to remove sludge or other unnecessary material. The filter 46 is, for example, a cylinder formed of porous ceramic. A cylindrical pipe 44 projecting from the outlet 8 is fitted to the lower end of the filter 46 to connect the filter 46 to the outlet 8. The upper end of the filter 46 projects above the surface of the processing solution.

A cylindrical protrusion having the same diameter as that of the hollow portion of the filter 46 is provided on the lower surface of the one end of the support member 48. A groove having a width substantially equal to the thickness of the side wall of the processing solution container 2 is formed on the lower surface of the other end of the support member 48. The distance between the groove and the cylindrical protrusion is nearly equal to the distance between the inner surface of the side wall of the container 2 and the pipe 44.

The cylindrical portion of the support member 48 is fitted in the opening of the upper end of the filter 46 and the groove at the other end of the support member 48 is fitted with the upper end of the side wall of the container 2, to the stably support the filter 46.

In operation, processing solution enters the hollow portion of the filter 46 through the side wall thereof and sludge and other unnecessary material in the processing solution is filtered off by the filter 46. The processing solution further passes through the outlet 8 and is discharged into the pipe 44 from the lower end of the filter 46.

Since the upper end of the filter 46 projects above the surface of the processing solution, processing solution containing sludge or other unnecessary material does not flow into the hollow portion of the filter 46. Since the upper end of the filter 46 is supported by the support member 48, the filter 46 is stably set.

In addition, the support member 48 can be detached from the processing solution container 2 and the upper end of the filter 46. Since the upper end of the filter 46 projects above the surface of the processing solution, the filter device 42 can be removed from the container 2 by detaching the support member 48 from the filter 46 and taking out the filter 46 while holding the upper end thereof. The device 42 can be attached to the container 2 similarly, in reverse order. Accordingly, exchanging filter devices 42 can be done verY easilY.

Although the filter device is connected to the outlet in each of the above described embodiments, the filter device may be connected to the inlet to achieve the same meritorious effects.

Although the present invention has been described and illustrated in detail, it is clearly understood that the same is by way of illustration and example only and is not to be taken by way of limitation. The spirit and scope of the present invention should be limited only by the terms of the appended claims.

I claim:

1. A method of easily replacing a filter within a photosensitive material processing system without leakage, said method comprising:

providing a container holding photosensitive material processing solution, the container having a processing solution inlet and a processing solution outlet and a bottom surface, the processing solution extending in the container from said bottom surface to an upper surface of said processing solution along a depth dimension, said outlet being formed on the bottom surface of said container;

providing a filter in said container, said filter having an upper portion located above the upper surface of said processing solution and said filter extending to said outlet, said filter being disposed in said container so that it extends substantially along the entirety of said depth dimension;

removing the filter from the outlet of the container which is full of photosensitive material processing solution by gripping and manipulating the upper portion of said filter,; and attaching a replacement filter to said outlet of said container by gripping and manipulating an upper portion of said replacement filter, said upper portion of said replacement filter being located above said surface of said photosensitive material processing solution.

2. A system for filtering circulating photosensitive material processing solution, said system comprising:

a container for containing circulating photosensitive material processing solution, said container having a bottom surface, an inlet for receiving said circulating solution and an outlet for discharging said circulating solution, at least one of said inlet and outlet being disposed at said bottom surface and said photosensitive material processing solution extending along a depth dimension from said bottom surface of said container to an upper surface of said solution; and a filter detachably covering one of said inlet and outlet, said filter having an upper portion which projects above the surface of said circulating solution when said container is filled with said circulating solution, whereby said filter can be easily removed from and attached to said container and whereby said filter extends along substantially the entirety of said depth dimension.

3. The system of claim 2, wherein a lower portion of said filter is removably attached to said outlet.

4. The system of claim 3, wherein said filter includes a grip located at said upper portion for easily attaching or removing said filter to or from said outlet.

5. The system of claim 2, further comprising support means located at said upper portion for stably supporting said filter within said container, said support means being detachably fixed to said container.

6. The system of claim 5, wherein said support means is detachably fixed to said upper portion.

7. The system of claim 2, wherein said filter is connected to said inlet.

8. The system of claim 2, further comprising guide means for guiding photosensitive material through a predetermined course within said container;

said filter being located so as not to interfere with said guide means.

9. The system of claim 8, wherein said guide means includes:

rollers for supporting photosensitive material, one or more of said rollers being located within said solution when said container is filled with said solution;

guide members for guiding said photosensitive material along said rollers; and means for supporting said rollers and said guide members within said container.

10. The system of claim 9, wherein said rollers extend the width of said photosensitive material, each one of said rollers being in contact with another one of said rollers to hold said photosensitive material therebetween.

11. The system of claim 1, further comprising circulating means connected between said inlet and said outlet for circulating said solution.

12. The system of claim 11, wherein said circulating means includes:

piping connected to said inlet and said outlet for guiding said circulating solution; and a pump connected to said piping for applying pressure to circulate said solution through said piping and said container.

13. The system of claim 11, further comprising means for maintaining said solution at a predetermined temperature.

14. A system for filtering circulating photosensitive material processing solution, said system comprising:

a container for containing circulating photosensitive material processing solution, said container having an inlet for receiving said circulating solution and an outlet for discharging said circulating solution; and a filter detachably covering said inlet or said outlet, said filter having an upper portion which projects above the surface of said circulating solution when said container is filled with said circulating solution and a lower portion which is removably attached to said outlet, whereby said filter can be easily removed from and attached to said container;

said lower portion being screwed into said outlet.

15. A system for filtering circulating photosensitive material processing solution, said system comprising:

a container for containing circulating photosensitive material processing solution, said container having an inlet for receiving said circulating solution and an outlet for discharging said circulating solution; and a filter detachably covering said inlet or said outlet, said filter having an upper portion which projects above the surface of said circulating solution when said container is filled with said circulating solution and a lower portion which is removably attached to said outlet, whereby said filter can be easily removed from and attached to said container;

said filter including means located at said lower portion for preventing filtrate from diffusing into said solution.

* * * * *